United States Patent [19]

Kitamura

[11] Patent Number: 4,773,152

[45] Date of Patent: Sep. 27, 1988

[54] AUTOMATIC TOOL CHANGER

[75] Inventor: Koichiro Kitamura, Takaoka, Japan

[73] Assignee: Kitamura Machinery Co., Ltd., Japan

[21] Appl. No.: 13,456

[22] Filed: Feb. 11, 1987

[30] Foreign Application Priority Data

Feb. 13, 1986 [JP] Japan .................. 61-27892

[51] Int. Cl.⁴ .......................................... B23Q 3/157
[52] U.S. Cl. .................................................... 29/568
[58] Field of Search ........................................ 29/568

[56] References Cited

U.S. PATENT DOCUMENTS

| | | | |
|---|---|---|---|
| 3,820,234 | 6/1974 | Poincenot | 29/568 |
| 4,602,901 | 7/1986 | Cotta Ramusino | 29/568 X |
| 4,648,171 | 3/1987 | Yasukawa | 29/568 |
| 4,670,965 | 6/1987 | Sato et al. | 29/568 |

Primary Examiner—Gil Weidenfeld
Assistant Examiner—Steven C. Bishop
Attorney, Agent, or Firm—Ronald P. Kananen

[57] ABSTRACT

A machine tool (1) includes a machine spindle (1b), a tool storage magazine (3, 103) having a plurality of pots (23, 123) for storing a plurality of tools (42, 142) and an automatic tool changer (5) for transferring tools (42, 142) between the tool storage magazine (3, 103) and the machine spindle (1b). The automatic tool changer (5) includes a tool changing arm (75), a first means for moving the tool changing arm (75) in a first direction with a predetermined stroke, a second means for moving the tool changing arm (75) in a second direction with a predetermined stroke, a third means for swinging the tool changing arm (75) in a third direction with a predetermined stroke, and a fourth means for rotating the tool changing arm (75) in a fourth direction.

15 Claims, 15 Drawing Sheets

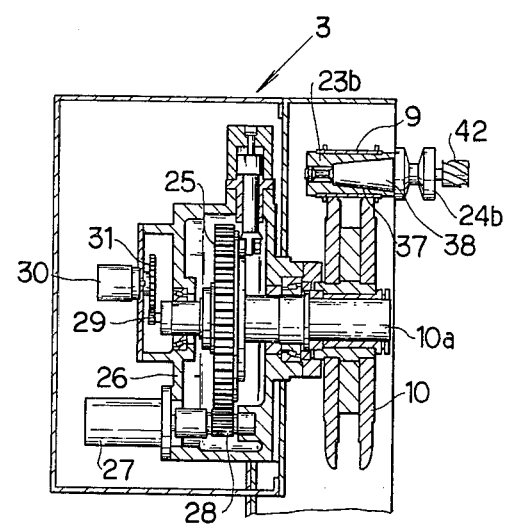
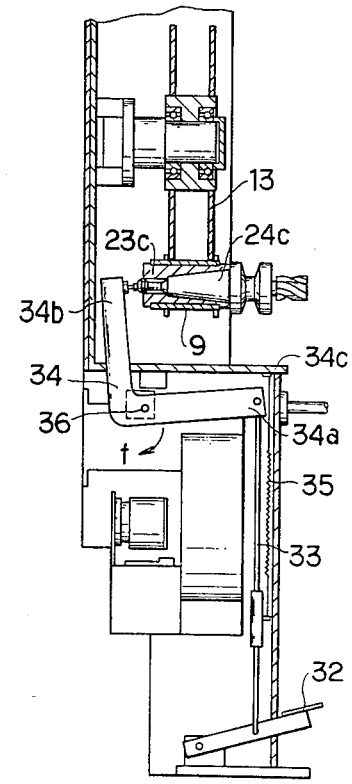
Fig.3

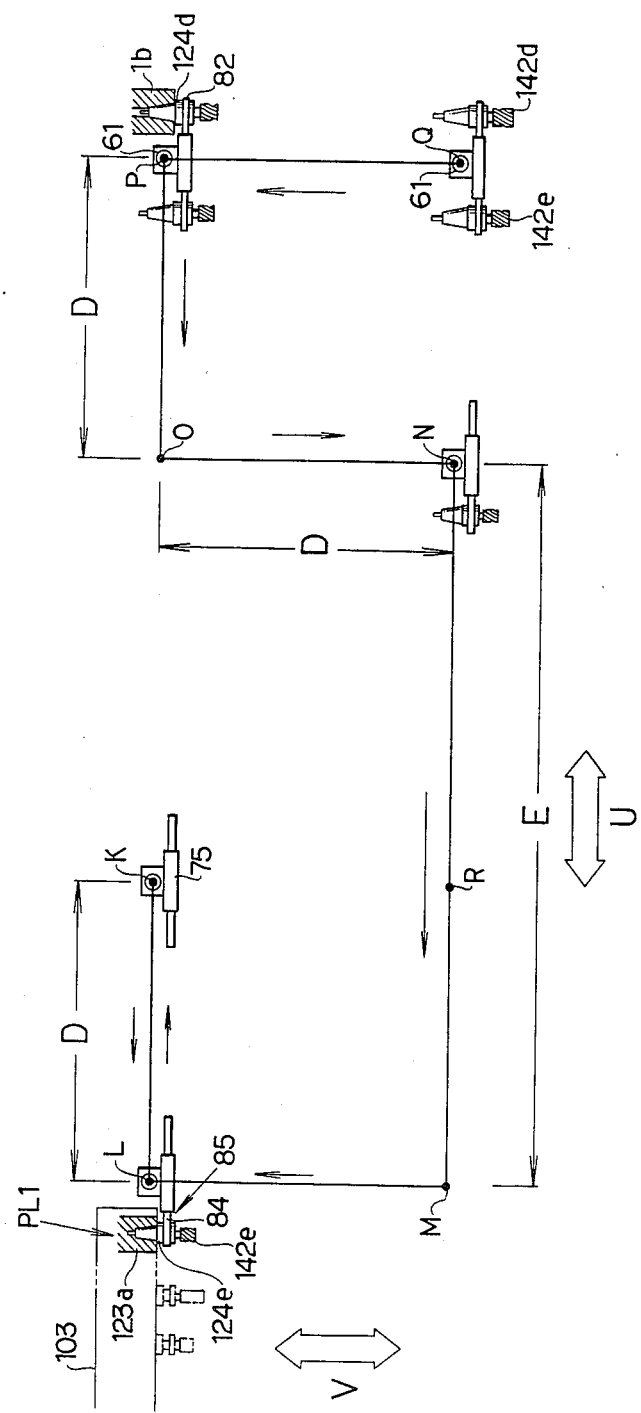

AUTOMATIC TOOL CHANGER

BACKGROUND OF THE INVENTION

This invention relates to a tool changing mechanism for a numerically controlled machine.

Automatic tool changers are used to remove an old tool from a machine spindle and place it in a tool storage magazine, and take a new tool from the tool storage magazine and place it into the machine spindle.

In machine tools such as machining centers, a workpiece is machined by many tools. For instance, 60 tools or more must be stored in a tool storage magazine. Thus, the tool storage magazine is normally large in size.

A large tool storage magazine cannot be set near a machine spindle, but must be set reasonably apart from the machine spindle.

In a conventional automatic tool changer having a double arm construction, an arm takes a new tool from the tool storage magazine and transfers it to the machine spindle. While the arm grips the new tool, it also grips an old tool and withdraws it from the machine spindle. After that, the positions of the new and old tools are exchanged, and then the new tool is inserted into the machine spindle. The old tool is returned to a specific station in the tool storage magazine.

The problem with such conventional automatic tool changers is that the size must be large in order to control precisely many complicated motions of the arm while the tool is transferred over a long distance.

On the other hand, some conventional automatic tool changers are directly attached to a machine tool body. Each axis of tools stored in a tool storage magazine is parallel to the axis of the machine spindle. In such cases, the tool changing operations cannot be easily controlled.

SUMMARY OF THE INVENTION

An object of this invention is to provide an automatic tool changer which can be relatively small in size.

A further object of this invention is to provide an automatic tool changer in which the tool changing operations can be easily controlled even if each axis of the tools stored in a tool storage magazine is perpendicular or parallel to the axis of a machine spindle.

According to this invention, there is provided a machine tool including a machine spindle, a tool storage magazine having a plurality of pots for storing a plurality of tools and an automatic tool changer for transferring tools between the tool storage magazine and the machine spindle, the automatic tool changer including a tool changing member such as an arm, a first means for moving the tool changing member or arm in a first direction with a predetermined stroke, a second means for moving the tool changing member or arm in a second direction with a predetermined stroke, a third means for swinging the tool changing member or arm in a third direction with a predetermined stroke, and a fourth means for rotating the tool changing member or arm in a fourth direction. The tool changing member or arm is preferably a double arm. The first direction is preferably perpendicular to the second direction.

The tool changing member or arm can move freely in any direction so that the tools can be changed between the machine spindle and the pots of the tool storage magazine even if each axis of the tools stored in the tool storage magazine is perpendicular or parallel to the axis of the machine spindle. Also, an automatic tool changer according to this invention can be compact in size so that it can be easily set near or on a machine tool body.

BRIEF DESCRIPTION OF THE DRAWINGS

FIG. 3 is an end view taken along the line F—F of FIG. 2 with some parts being omitted;

FIGS. 13 to 16 are explanatory views showing specific modes of sequential arm movements and tool changing operations.

BRIEF DESCRIPTION OF THE EMBODIMENTS

Figure 4:
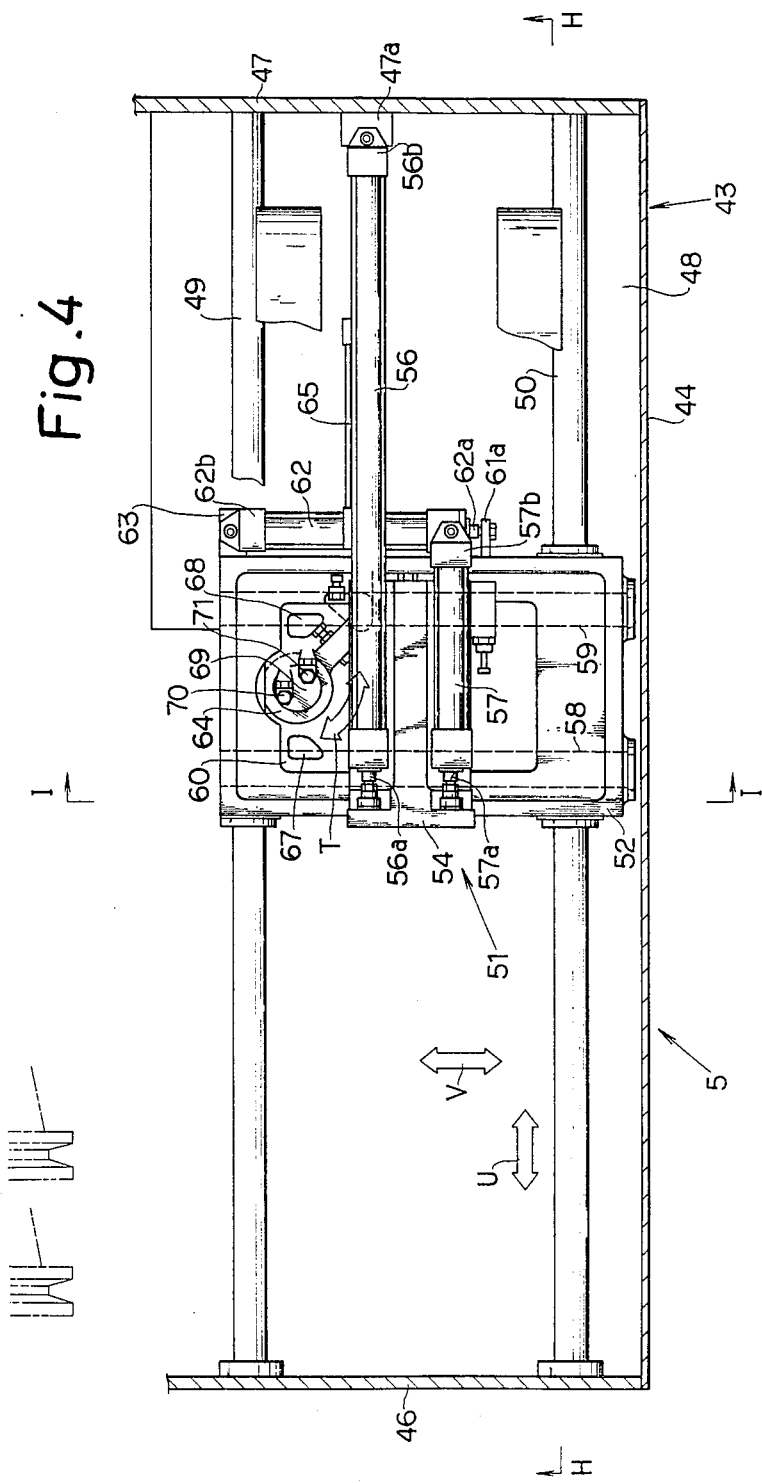
FIG. 4 is a sectional view taken along the line G—G of FIG. 1.
Figure 13:
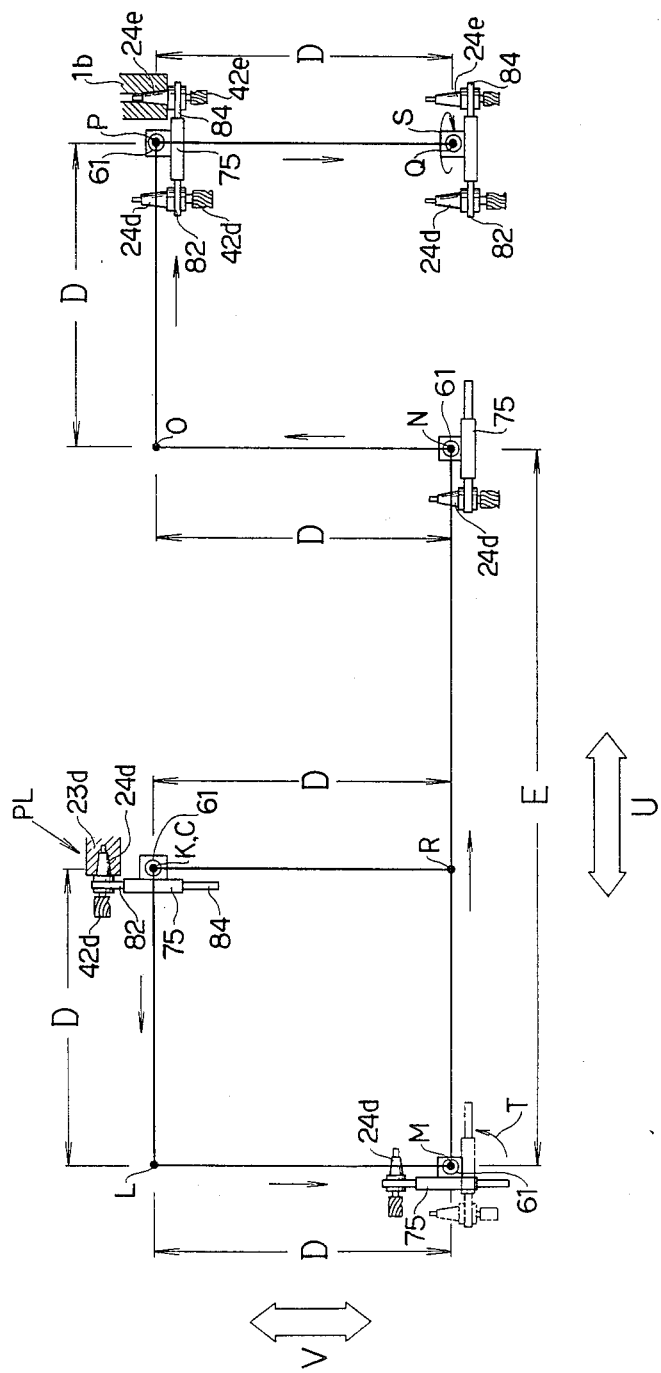

An automatic tool changer 5 includes a double arm 75 which can move with a predetermined stroke by means of a cylinder means 56, 57 in a first direction as shown by the arrow U in FIGS. 4 and 13. The arm 75 can also move in a second direction as shown by the arrow V with a predetermined stroke by means of a cylinder means 62. The first direction is perpendicular to the second direction.

The arm 75 can turn about the axis 61 (FIGS. 10, 13 and 14) within a limited angle such as 90 degrees in the direction of the arrow T in FIGS. 4 and 13.

Figure 10:
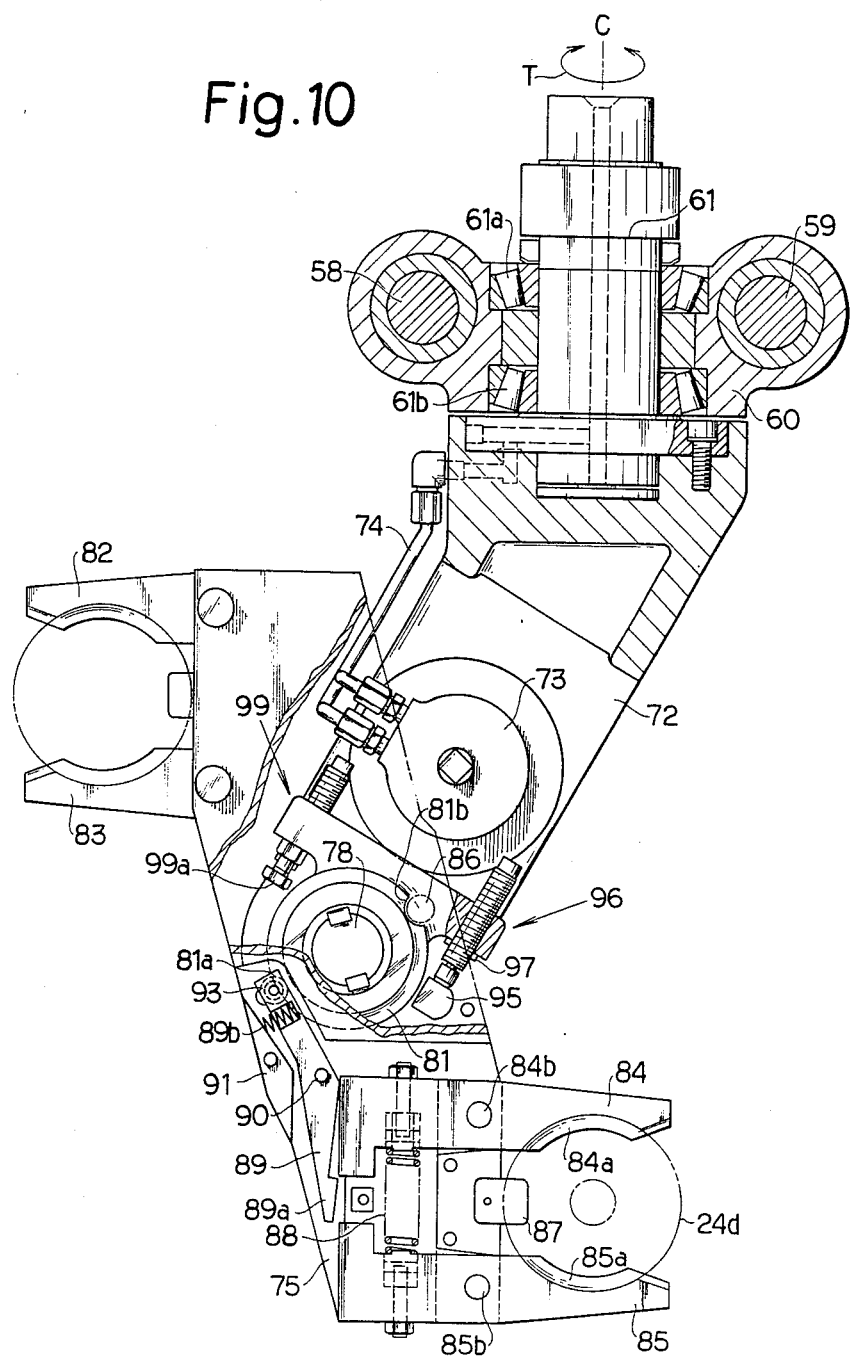
FIG. 10 is a sectional view showing a second member, a turn frame and an arm for use in an automatic tool changer.

The arm 75 includes a first pair of fingers 82, 83 and a second pair of fingers 84, 85 as shown in FIG. 10. The arm 75 is used to grip a tool holder 24d for a tool 42d in a tool storage magazine 3 at a predetermined point PL and a tool holder 24e for a tool 42e in a machine spindle 1b. Also, the arm 75 is used to exchange the positions of both tools 42d and 42e by rotating them by 180 degrees in the direction of the arrow S in FIG. 5.

Figure 14:
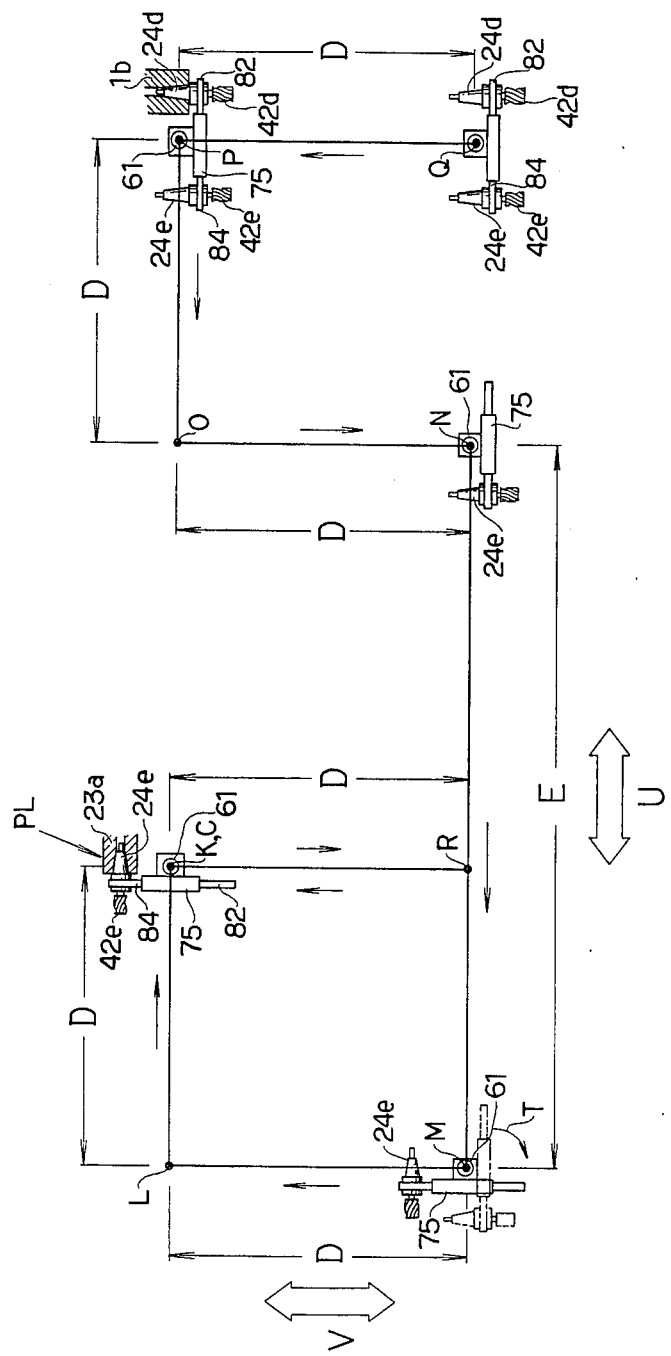

In FIGS. 13 and 14, the axis of the tool 42d in the tool storage magazine 3 is perpendicular to the axis of the machine spindle 1b.

The tool holder 24d for a new tool 42d in the tool storage magazine 3 is gripped by the fingers 82, 83 of the arm 75 and then withdrawn from the tool storage magazine 3 in the direction of the arrow U. At the point M in FIG. 13, the arm 75 turns in the direction of the arrow T. After that, the arm 75 moves toward the machine spindle 1b in the directions of the arrows U and V.

After the fingers 84, 85 of the arm 75 grip the tool holder 24e for an old tool 42e in the machine spindle 1b, the tool holder 24e is withdrawn from the machine spindle 1b in the direction of the arrow V. The arm 75 rotates in the direction of the arrow S so that the positions of the tools 42d, 42e are exchanged as shown in FIG. 14. After the tool holder 24d for the tool 42d is inserted into the machine spindle 1b, the arm 75 turns by 90 degrees in the direction of the arrow T at the point M in FIG. 14. After that, the tool holder 24e for the old tool 42e is returned to a specific pot 23a at the specific point PL in the tool storage magazine 3.

Figure 15:
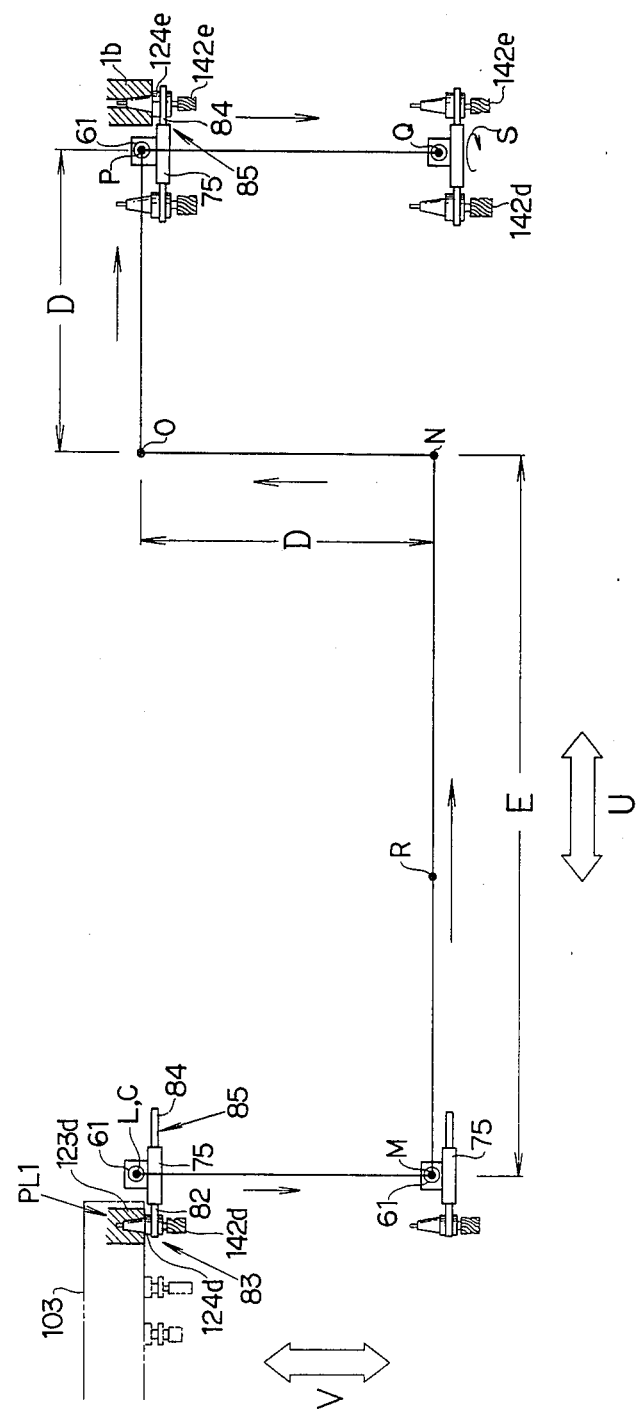

FIGS. 15 and 16 show a further arrangement in which the axis of the tool 142d in the tool storage magazine 103 is in parallel to the axis of the machine spindle 1b.

As shown in FIG. 15, the tool holder 124 for a new tool 142d in the tool storage magazine 103 is gripped by the fingers 82, 83 of the arm 75 and then withdrawn from the tool storage magazine 103 in the direction of the arrow U. The arm 75 moves toward the machine spindle 1b in the directions of the arrows U and V.

After the fingers 84, 85 of the arm 75 grip the tool holder 124e for an old tool 142e in the machine spindle 1b, the tool holder 124e is withdrawn therefrom in the direction of the arrow V. The arm 75 rotates in the direction of the arrow S so that the positions of the tools 142d, 142e are exchanged as shown in FIG. 16. After that, the tool holder 124d for the new tool 142d is inserted into the machine spindle 1b. The tool holder 124e for the old tool 142e is returned to a specific pot 123a at the point PL in the tool storage magazine 103.

DETAILED DESCRIPTION OF THE EMBODIMENTS

Figure 1:
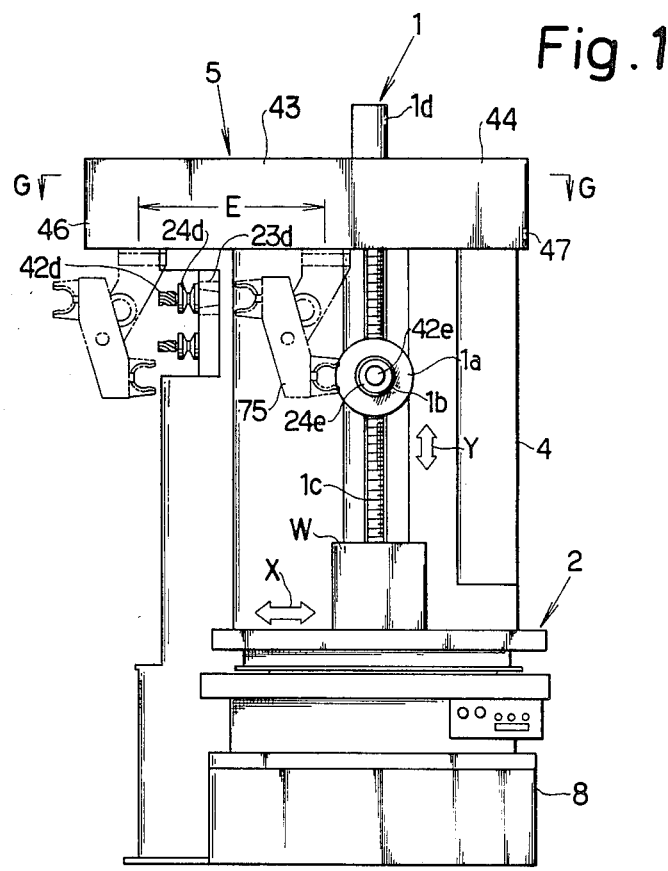
FIG. 1 is a schematic front view showing a machine tool equipped with an automatic tool changer according to this invention.
Figure 2:
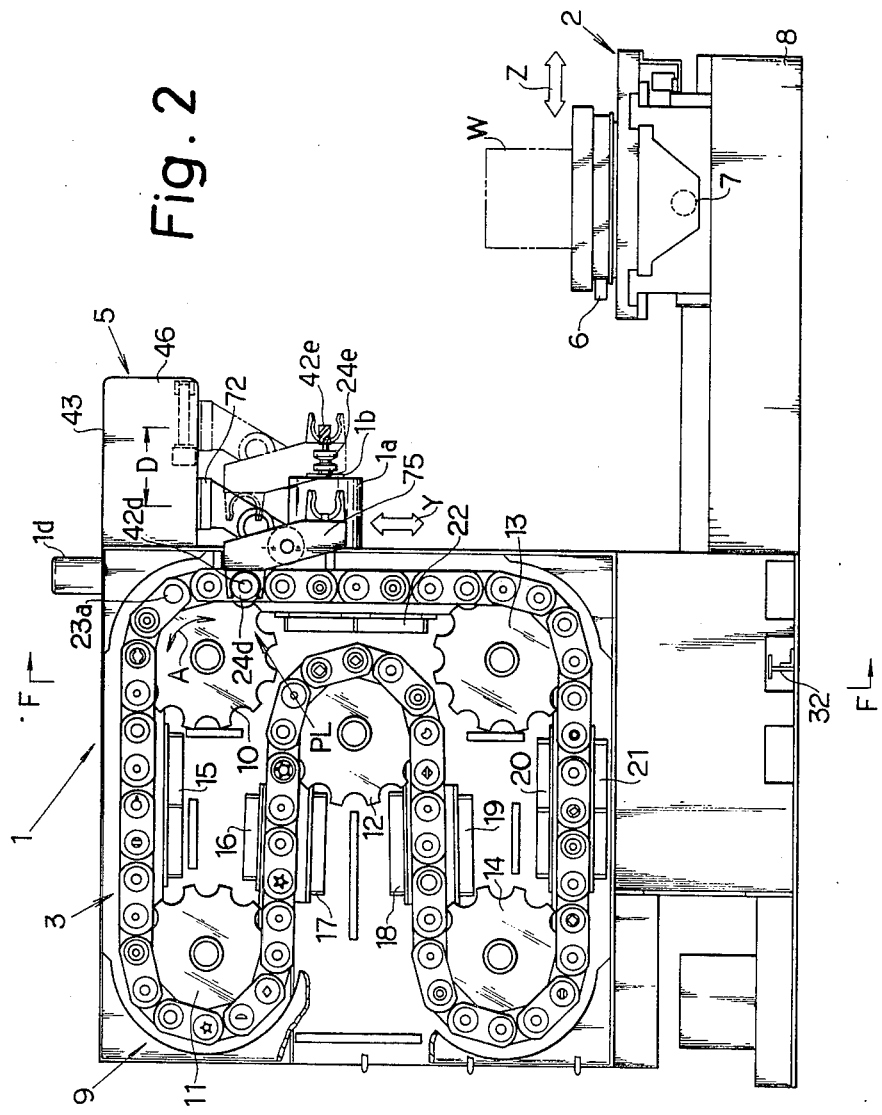
FIG. 2 is a side view of the machine tool shown in FIG. 1.

FIGS. 1 and 2 show a machine tool 1 which is preferably a horizontal machining center including a table 2, a CNC machine 4 and an automatic tool changer 5.

The table 2 can move in the direction of the arrow Z by means of a servomotor 6 and in the direction of the arrow X by means of a servomotor 7. The servomotors 6, 7 can be actuated according to a predetermined program set in the CNC machine 4. The table 2 is provided on a base 8. A workpiece W is to be attached on the table 2.

A tool holder 24e is set in a machine spindle 1b at a spindle head 1a. The tool holder 24e may be attached to it by means of a conventional collet type chucking device, for example. The spindle head 1a can move in the direction of the arrow Y by means of a servomotor 1d when it rotates a feeding screw 1c.

As shown in FIGS. 2 and 3, the automatic tool changer 5 includes a tool storage magazine 3 equipped with a chain means 9 which engages a plurality of wheels 10, 11, 12, 13, 14. The chain means 9 is supported by a plurality of chain supports 15 through 22. A plurality of pots such as pots 23a, 23b, 23c are set in the chain means 9 at regular intervals. In the shown embodiment, sixty pots are used in the chain means 9.

As best shown in FIG. 3, a tool holder 24d is attached to the pot 23b, and a tool holder 24c is attached to the pot 23c. Two gears 25, 29 are fixed to a shaft 10a of the wheel 10. A hydraulic motor 27 is provided to a frame 26. A gear 28 is fixed to an output shaft of the motor 27 and engages with the gear 25. The gear 29 engages a gear 31 joined to an absolute type encoder 30. According to a predetermined program in a CNC means 4, the motor 27 is so actuated that the chain means 9 can move in the direction of the arrow A in FIG. 2.

Each pot for holding a specific tool holder has a specific address which is provided by the encoder 30. In response to a command signal from the CNC machine 4, a predetermined tool holder such as the tool holder 24d in FIG. 2 is set at a predetermined point PL.

Referring again to FIGS. 2 and 3, a pedal 32 is placed under the tool storage magazine 3. The pedal 32 is connected via a joint element 33 to one end 34a of a L-shaped lever 34. A spring 35 is positioned between the joint element 33 and the frame 34c. An intermediate portion of the lever 34 is supported by a pin 36. If an operator kicks the pedal 32, then the lever 34 rotates in the direction of the arrow f whereby the other end 34b of the lever 34 pushes the tool holder 24c in the pot 23c so as to remove it from the pot 23c.

Each of the pots has a female-taper opening. For instance, the female-taper opening 37 of the pot 23b in FIG. 3 is used to receive a male-taper portion 38 of the tool holder 24b.

Figure 11:
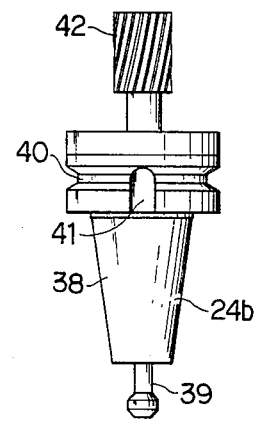
FIG. 11 is a side view showing a tool gripper and a tool for use in an automatic tool changer.

The tool holder 24b can be constructed in a shape as shown in FIG. 11. A rod 39 is joined to the taper portion 38. A groove 40 and a cutout 41 are formed in the tool holder 24b. A tool 42 is detachably attached to it. All tool holders can be shaped like the tool holder 24b, and each tool holder is attached to each corresponding pot by means of a collet type chuck.

Referring to FIGS. 1, 2 and 4 through 12, the automatic tool changer 5 includes a casing 43 composed essentially of a front plate 44, a top plate 45, a left plate 46, a right plate 47 and a bottom plate 48. Parallel guide rods 49, 50 extend between the left plate 46 and the right plate 47 in the first direction of the arrow U (FIG. 4). A first slide member 51 is slidably provided to the guide rods 49, 50. A guide rod 53 is attached to a frame 52 for the first slide member 51 in parallel to the guide rods 49, 50. The guide rod 53 penetrates through a cylindrical portion 55 of a joint member 54.

A rod 56a of a cylinder means 56 and a rod 57a of a cylinder means 57 are joined to the joint member 54. A bottom portion 56b of the cylinder means 56 is joined to the right plate 47 by way of a bracket 47a. A bottom portion 57b of the cylinder means 57 is joined to the frame 52.

Figure 5:
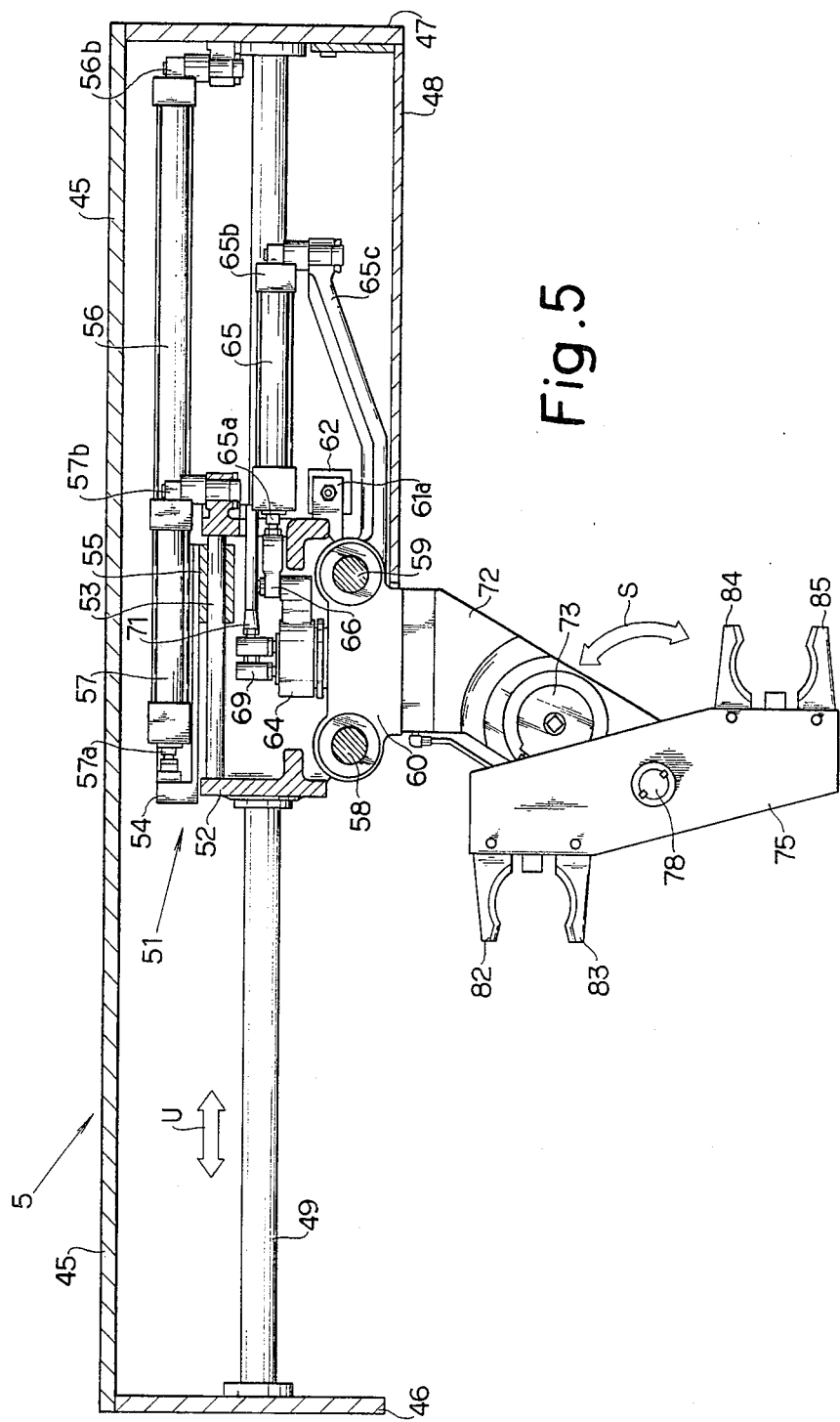
FIG. 5 is a sectional view taken along the line H—H of FIG. 4.

Referring to FIGS. 4 and 5, if the rod 57a of the cylinder means 57 expands, the frame 52 for the first slide member 51 can move in the right direction of the arrow U in FIG. 4. At that time, the rod 56a of the cylinder means 56 is in a contracted position while the joint member 54 does not move.

Guide rods 58, 59 are placed within the first slide member 51 in the second direction of the arrow V in FIG. 4. These guide rods 58, 59 are perpendicular to the guide rod 53. A second slide member 60 is slidably attached to the guide rods 58, 59.

A rod 62a of a cylinder means 62 is joined to a bracket 61a of the second slide member 60. The bottom portion 62b of the cylinder means 62 is attached via a bracket 63 to the frame 52. As shown in FIG. 10, a turn shaft 61 is provided to the second slide member 60 and supported by two bearing means 61a, 61b.

Figure 7:
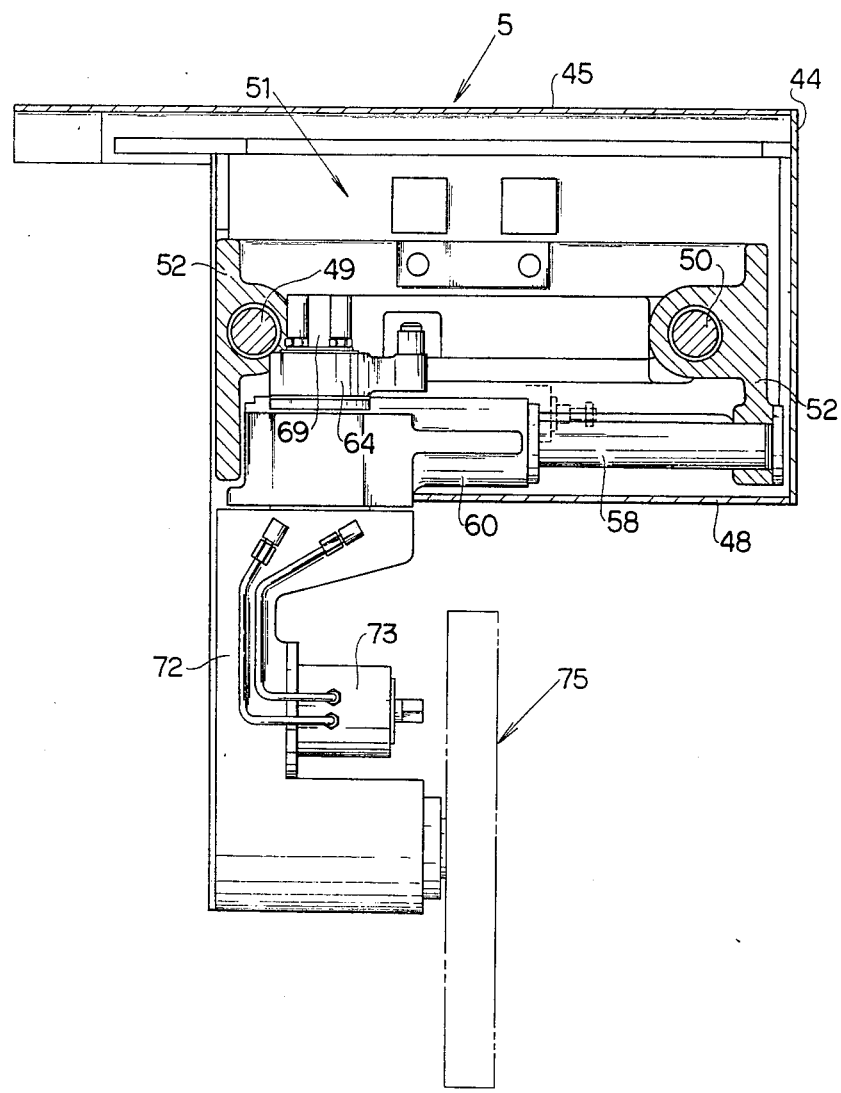
FIG. 7 is a sectional view taken along the line I—I of FIG. 4.
Figure 8:
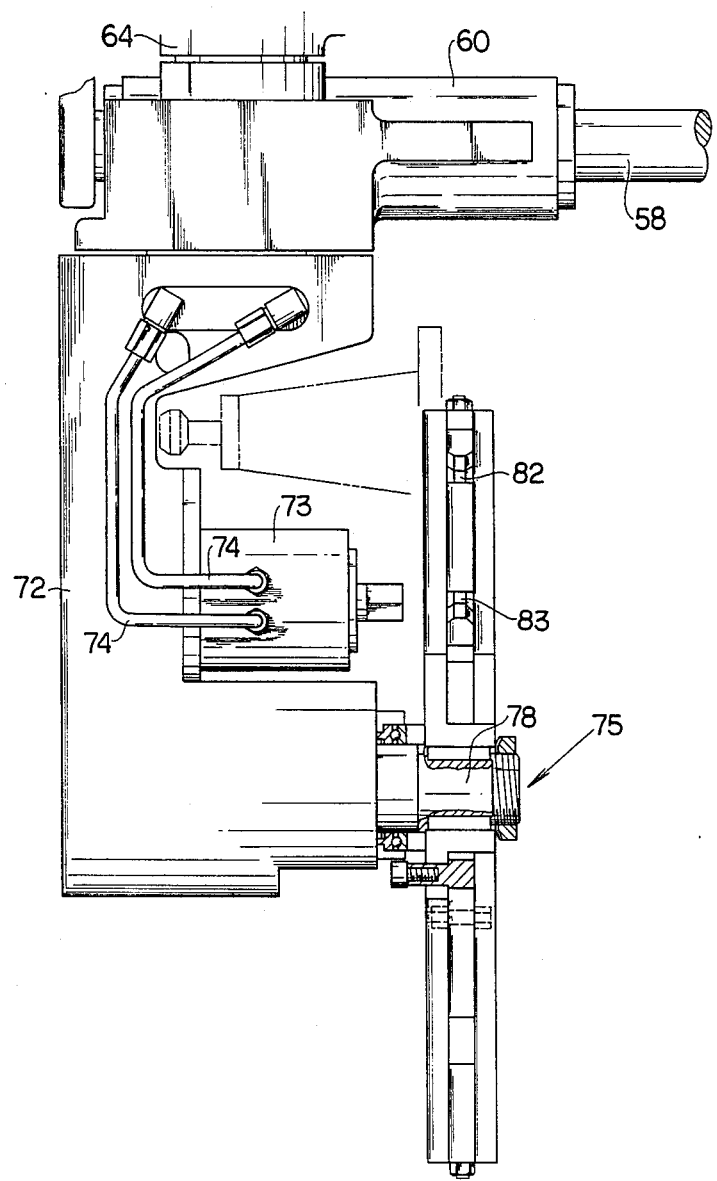
FIG. 8 is a side view showing a second slide member, a turn frame and an arm for use in an automatic tool changer.

A swing arm 64 is fixed to the turn shaft 61 as shown in FIGS. 4, 5 and 7. As shown in FIG. 5, the swing arm 64 is connected by way of a connector 66 to a rod 65a of a cylinder means 65. A bottom portion 65b of the cylinder means 65 is supported by the second slide member 60 through a long element 65c.

In FIG. 4, stops 67, 68 are used to control precisely the swinging angle of the swing arm 64. The upper end of the swing arm 64 is connected via a swivel joint 69 to two slide rods 70, 71. As shown in FIGS. 4 and 5, if the rod 65a of the cylinder means 65 expands, the turn shaft 61 turns in the third direction of the arrow T in FIGS. 4 and 10. The turn angle of the turn shaft 61 is preferably 90 degrees.

Figure 9:
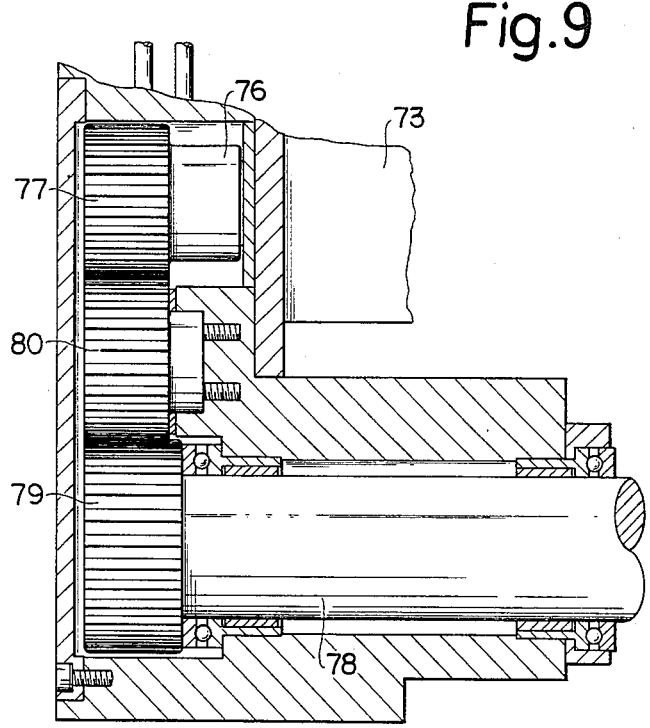
FIG. 9 is a sectional view showing an underside portion of the turn frame.

Referring to FIGS. 5, 7, 8 and 10, a frame 72 is fixed to a lower portion of the turn shaft 61. A hydraulic rotor 73 is attached to an intermediate portion of the frame 72. Two oil feeding pipes 74 are joined to the hydraulic rotor 73. An arm 75 is provided to a lower portion of the frame 72 so as to rotate in the fourth direction of the arrow S in FIG. 5. In FIG. 9, a gear 77 is attached to an output shaft 76 of the hydraulic rotor 73. A gear 79 is secured to a shaft 78 of the arm 75. The gears 79, 77 engage with a gear 80. Thus, the hydraulic rotor 73 can rotate the arm 75 through the gears 77, 80, 79 in the direction of the arrow S in FIG. 5.

A circular cam 81 is fixed to the shaft 78. The arm 75 has a first pair of fingers 82, 83 and a second pair of fingers 84, 85 as a double arm construction. The arm 75 is symmetrical. As the fingers 82, 83 and their related members are substantially the same as the fingers 84, 85 and their related members, only the latter will be explained.

The fingers 84, 85 have inner grip portions 84a, 85a corresponding in shape to the groove 40 of the tool holder 24b as shown in FIG. 11. The fingers 84, 85 are attached to the arm body by means of pins 84b, 85b. The finger 84 can move about the pin 84b while the finger 85 can move about the pin 85b. The arm 75 has a stop 87 which is to be inserted into the cutout 41 of the tool holder 24b. A spring 88 is set between the fingers 84 and 85 for the pulling purpose.

A stop 89 is placed within the arm 75 by means of a pin 90. A spring 89b is placed between the stop 89 and a member 91. When one end 89a of the stop 89 is inserted between the two fingers 84 and 85, the grip portion 84a of the finger 84 and the portion 85a of the finger 85 can contact the groove 40 of the tool holder 24b against the force of the spring 88. A roller 93 is attached to the other end of the stop 89. The roller 93 can roll along the periphery of the cam plate 81 so as to be inserted into the groove 81a or 81b.

As shown in FIG. 10, if the arm 75 is positioned at a predetermined point, the roller 93 is inserted into the groove 81a while the one end 89a of the stop 89 moves out of the fingers 84, 85. A roller 86 at the fingers 82, 83 is substantially the same as the roller 93 at the fingers 84, 85. The roller 86 is inserted into the groove 81b.

If the arm 75 rotates, then the roller 93 moves out of the groove 81 against the force of the spring 89b and then the one end 89a of the stop 89 is inserted between the two fingers 84, 85. As a result, the portions 84a, 85a can contact the groove 40 of the tool holder 24b so as to grip the tool holder 24b. The fingers 82, 83 operate in the same way.

If the arm 75 rotates by 180 degrees in the direction of the arrow S in FIG. 5, the rollers 93, 86 are inserted into the grooves 81b, 81a, respectively.

Figure 6:
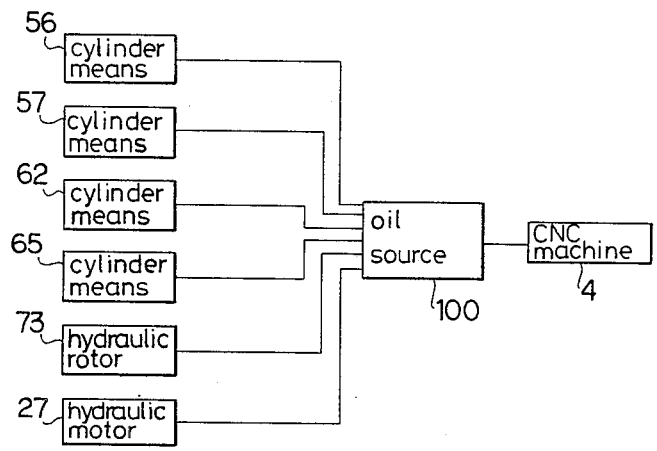
FIG. 6 is a schematic view showing a hydraulic circuit for use in an automatic tool changer for a numerically-controlled (NC) machine.
Figure 12:
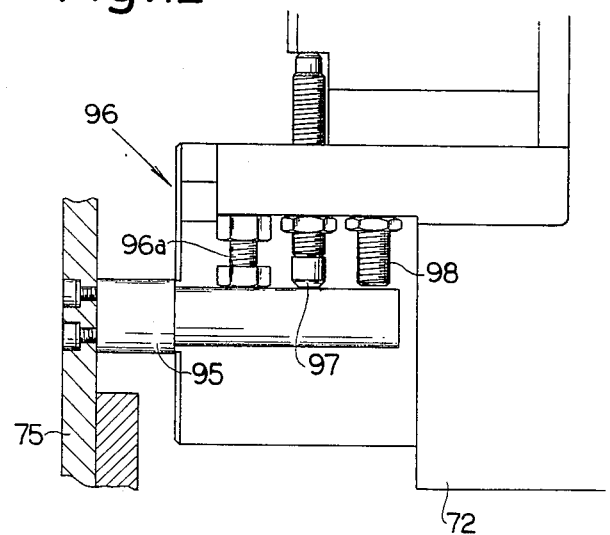
FIG. 12 is a schematic view showing an arm stop unit.

As shown in FIGS. 10 and 12, a stop 95 is attached to the arm 75. A stop unit 96 for the frame 72 includes a stop 96a, a shock absorber 97 and a proximity switch 98. A stop unit 99 is substantially the same as the stop unit 96. If the arm 75 moves to a position as shown in FIG. 10, the stop 96 and the shock absorber 97 receive the stop 95. At that time, the proximity switch 98 detects the stop 95 thereby to produce a detection signal whereby the CNC machine 4 can determine that the given rotation of the arm 75 has finished. In response to this signal, an oil source 100 in FIG. 6 is so controlled that the hydraulic rotor 73 can stop.

If the arm 75 clockwisely rotates by 180 degrees from the position of FIG. 10, the stop 95 contacts a stop 99a of the stop unit 99. It is detected by a proximity switch (not shown) and then a detection signal is sent to the CNC machine 4. These proximity switches has the same construction.

The sylinder means 56, 57, 61, 65 are preferably hydraulic. As shown in FIG. 6, the oil source 100 is connected to the cylinder means 56, 57, 62, 65 and the hydraulic rotors 73, 27. According to a predetermined program in the CNC machine 4, the oil source 100 is so controlled as to operate the cylinder means, the rotors and the motors in a desired manner.

In the shown embodiment, the cylinder means 57, 62, 65 have a stroke D of 170 mm while the cylinder means 56 has a stroke E of 650 mm.

The operation of the automatic tool changer will be explained, referring to FIGS. 4, 5, 10, 13 and 14. In the arrangement of FIGS. 13 and 14, each axis of the tools stored in the tool storage magazine 3 is perpendicular to the axis of the machine spindle 1b.

The center C of the turn shaft 61 (FIG. 10) coincides with the point K (FIG. 13). The fingers 82, 83 of the arm 75 grip the tool holder 24d set in the pot 23d at a predetermined point (FIGS. 1 and 2). In this step, the fingers 84, 85 do not grip any tool holder. The machine spindle 1b is positioned at a point corresponding to the fingers 84, 85 as shown in FIG. 2. The tool 42d in the tool holder 24d at the point PL is to be exchanged for the tool 42e in the tool holder 24e at the spindle 1b.

As shown in FIG. 2, no tool holder is inserted into the pot 23a at the chain means 9. The rod 56a of the cylinder means 56 is in an expanded position. The rod 57a of the cylinder means 57 is in an expanded position. The rod 65a of the cylinder means 65 is in an expanded position. The rod 62a of the cylinder means 62 is in a contracted position.

Referring to FIGS. 4, 5, 10 and 13, at first, the rod 57a of the cylinder means 57 begins to contract so that the first slide member 51 moves in the direction of the arrow U and the arm 75 moves in the direction of the arrow U with the stroke D. As a result, the center C of the turn shaft 61 moves to the point L. The tool holder 24d is removed from the pot 23d at the point PL.

The rod 62a of the cylinder means 62 expands. The second slide member 60 moves in the direction of the arrow V with the stroke D so that the center C of the turn shaft 61 moves to the point M. After that, teh rod 65a of the cylinder means 65 contracts whereby the arm 75 turns by 90 degrees in the direction of the arrow T.

Next, the rod 56a of the cylinder means 56 contracts so that the first slide member 51 moves in the direction of the arrow U with the stroke E. Thus, the center C of the turn shaft 61 moves to the point N.

The rod 62a of the cylinder means 62 contracts so that the second slide member 60 moves in the direction of the arrow V with the stroke D. Thus, the center C of the turn shaft 61 moves to the point 0.

Next, the rod 57a of the cylinder means 57 expands so that the first slide member 51 moves in the direction of the arrow V with the stroke D. Thus, the center C of the turn shaft 61 moves to the point P. At that time, the fingers 84, 85 grip the tool holder 24e set in the machine spindle 1b.

The rod 62a of the cylinder means 62 expands so that the second slide member 60 moves in the direction of the arrow V with the stroke D. The fingers 84, 85 withdraw the tool holder 24e from the machine spindle 1b. The center C of the turn shaft 61 moves to the point Q. After that, the arm 75 rotates by 180 degrees in the direction of the arrow S. At the point Q, therefore, the tool 42d is exchanged for the tool 42e.

Referring to FIGS. 4, 5, 10 and 14, the rod 62a of the cylinder means 62 contracts so that the second slide member 60 moves in the direction of the arrow V with the stroke D. The center C of the turn shaft 61 moves to the point P. At that time, the tool holder 24d in the fingers 82, 83 is inserted into the machine spindle 1b.

Accordingly, the tool holder 24d has been transferred from the pot 23d at the point PL in the tool storage magazine 3, to the spindle 1b.

Next, the rod 57a of the cylinder means 57 contracts so that the first slide member 51 moves in the direction of the arrow U with the stroke D. Thus, the center C of the turn shaft 61 moves to the point O.

The rod 62a of the cylinder means 62 expands so that the second slide member 60 moves in the direction of the arrow V with the stroke D. The center C of the turn shaft 61 moves to the point N.

The rod 56a of the cylinder means 56 expands while the rod 57a of the cylinder means 57 remains in a contracted position, whereby the first slide member 51 moves in the direction of the arrow U with the stroke E, and the center C of the turn shaft 61 moves to the point M. After that, the rod 65a of the cylinder means 65 and the arm 65a expand so that the arm 75 rotates in the direction of the arrow T by 90 degrees.

The rod 62a of the cylinder means 62 contracts so that the second slide member 60 moves in the direction of the arrow V with the stroke D. The center C of the turn shaft 61 moves to the point L. By that time, the pot 23a in the tool storage magazine 3 has been positioned at the point PL.

Further the rod 57a of the cylinder means 57 expands so that the second slide member 51 moves in the direction of the arrow U with the stroke D and the center C of the turn shaft 61 moves to the point K. Thus, the tool holder 24e between the fingers 84, 85 is inserted into the pot 23a.

Next, the rod 62a of the cylinder means 62 expands so that the second slide member 60 moves in the direction of the arrow V with the stroke D. Thus, the tool holder 24e is removed from the fingers 84, 85. The center C of the turn shaft 61 moves to the point R. A further new tool holder in another pot is positioned at the point PL.

After that, if the rod 62a of the cylinder means 62 contracts, the center C of the turn shaft 61 moves to the point K. Thus, the fingers 84, 85 can grip the new tool holder at the point PL.

The same operation as above-stated will be repeated for the purpose of automatic tool changing.

Incidentally, when no tool holder is set in the machine spindle 1b, a tool holder can be inserted into the machine spindle 1b in the above-stated manner.

A further arrangement of the tool storage magazine will be explained, referring to FIGS. 15 and 16. In this arrangement, each axis of the tools stored in the tool storage magazine 3 is in parallel to the axis of the machine spindle 1b. The construction of FIGS. 15 and 16 is substantially the same as that of FIGS. 1 through 14 except the tool storage magazine 103 corresponding to the tool storage magazine 3.

In FIG. 15, the tool 142d in the pot 123d positioned at the point PL in the tool storage magazine 103 is to be exchanged for the tool 142e in the machine spindle 1b.

The center C of the turn shaft 61 is positioned at the point L. The fingers 82, 83 grip the tool holder 124d. The arm 75 moves in the direction of the arrow V with the stroke D. Thus, the center C of the turn shaft 61 moves to the point M. Further, the arm 75 moves in the direction of the arrow U so that the center C of the turn shaft 61 moves to the point N. Next, the arm 75 moves in the direction of the arrow V so that the center C moves to the point O. In addition, the arm 75 moves in the direction of the arrow U so that the center C moves to the point P. At that time, the fingers 84, 85 grip the tool holder 124e set in the machine spindle 1b.

Next, the arm 75 moves in the direction of the arrow V so that the center C of the turn shaft 61 moves to the point Q. Thus, the arm 75 rotates in the direction of the arrow S by 180 degrees. As a result, the tool 142d is exchanged for the tool 142e.

As shown in FIG. 16, if the center C of the turn shaft 61 moves from the point Q to the point P, the tool hodler 124d is inserted into the machine spindle 1b. On the other hand, the pot 123a has been positioned at the point PL1.

The center C of the turn shaft 61 moves via the points O, N, P, R and M to the point L. During this movement of the turn shaft 61, the tool holder 124d is removed from the fingers 82, 83 while the tool holder 124e is inserted into the pot 123a in the tool storage magazine 103.

After that, when the center C of the turn shaft 61 moves to the point K, the tool holder 124e is removed from the fingers 84, 85. Thus, exchanging of the tools 142d and 142e has completed.

Although only some preferred embodiments of this invention have been disclosed and described, it is apparent that other embodiments and modification of this invention are possible without departing from the spirits thereof. For example, the cylinder means 56, 57, 62, 65 may be formed of an air pressure type or an oil type. Any other actuating means can be used in place of the cylinder means. For instance, a linear motor, a bar screw combined with a pulse-motor, or a ball screw combined with a servomotor can be used.

The first direction shown by the arrow U in FIG. 4 can be at any angle other than 90 degrees to the second direction shown by the arrow V in FIG. 4. Also, the swing angle of the arm 75 in the third direction shown by the arrow T in FIG. 10 can be set any angle other than 90 degrees.

The arm 75 can have at its ends conventional elecromagnetic gripping means (not shown) in place of the fingers 82 through 85. The arm 75 can be equipped with a tranfer means such as a chain system having a plurality of mechanical or electromagnetic gripping means each of which is used to grip a tool for a tool storage magazine or a tool for a machine spindle. In this mode, the positions of the tools can be exchanged when the positions of the gripping means are changed by means of the transfer means. A pulse motor or servomotor can be used in place of the hydraulic motor 73.

An automatic tool changer according to this invention can be applied to a vertical machining center.

I claim:

1. In a machine tool (1) including a machine spindle (1b), a tool storage magazine (3, 103) having a plurality of pots (23, 123) for storing a plurality of tools (42, 142) and an automatic tool changer (5) for transferring tools (42, 142) between the tool storage magazine (3, 103) and the machine spindle (1b), the automatic tool changer (5) comprising:
   a frame (72);
   an arm (75) attached to the frame (72);
   a first means for moving the frame (72) and the arm (75) in a first direction (U) with predetermined stroke;
   a second means for moving the frame (72) and the arm (75) in a second direction (V) with a predetermined stroke, the first direction (U) being at a given angle to the second direction (V);
   a third means for swinging the frame (72) and the arm (75) in a third direction (T) with a predetermined stroke; and a fourth means for rotating the arm (75) relative to the frame (72) in a fourth direction (S);
   a pair of fingers (82 to 85) attached to the arm (75) for gripping a tool holder (24) by means of a spring force;
   a stop (89) attached to the arm (75) for moving into a position between the pair of fingers (82 to 85) so as to prevent them from disengaging the tool holder (24); and
   means (81) selectively positioning the stop (89) between the pair of fingers (82 to 85), wherein the stop, (89) is rotatable relative to the arm (75) around a pin (90).

2. An automatic tool changer as defined in claim 1, wherein the tool changing member (75) is a double arm (75).

3. An automatic tool changer as defined in claim 2, wherein the arm (75) has a double arm construction having a pair of gripping means (82 to 85), and wherein one gripping means (82, 83) takes a new tool from the tool storage magazine (3, 103) and transfers it to the machine spindle (1b), and wherein the other gripping means (84, 85) grips an old tool and withdraws it from the machine spindle (1b), and wherein the positions of the new and old tools are exchanged by rotating the arm (75), and then the new tool is inserted into the machine spindle (1b), while the old tool is returned to a specific station in the tool storage magazine (3, 103).

4. An automatic tool changer as defined in claim 1, wherein the first direction (U) is perpendicular to the second direction (V).

5. An automatic tool changer as defined in claim 1, wherein each axis of the tools stored in the tool storage magazine (3) is perpendicular to the axis of the machine spindle (1b).

6. An automatic tool changer as defined in claim 1, wherein each axis of the tools stored in the tool storage magazine (103) is in parallel to the axis of the machine spindle (1b).

7. The automatic tool changer of claim 1, wherein the positioning means (81) is a cam mechanism (81).

8. The automatic tool changer of claim 1, wherein the cam mechanism (81) includes a circular cam plate (81) and wherein the stop (89) has a roller (93) which engages the cam plate (81).

9. In a machine tool (1) including a machine spindle (1b), a tool storage magazine (3, 103) having a plurality of pots (23, 123) for storing a plurality of tools (42, 142) and an automatic tool changer (5) for transferreing tools (42, 142) between the tool storage magazine (3, 103) and the machine spindle (1b), wherein each axis of the tools stored in the tool storage magazine (103) is in parallel to the axis of the machine spindle (1b), the automatic tool changer (5) comprising:
   a frame (72);
   an arm (75) attached to the frame (72);
   a first means for moving the frame (72) and the arm (75) in a first direction (U) with predetermined stroke;
   a second means for moving the frame (72) and the arm (75) in a second direction (V) with a predetermined stroke, the first direction (U) being at a given angle to the second direction (V);
   a third means for swinging the frame (72) and the arm (75) in a third direction (T) with a predetermined stroke; and a fourth means for rotating the arm (75) relative to the frame (72) in a fourth direction (S);
   a pair of fingers (82 to 85) attached to the arm (75) for gripping a tool holder (24) by means of a spring force;
   a stop (89) attached to the arm (75) for moving into a position between the pair of fingers (82 to 85) so as to prevent them from disengaging the tool holder (24); and
   means (81) selectively positioning the stop (89) between the pair of fingers (82 to 85).

10. An automatic tool changer as defined in claim 9, wherein the tool changing member (75) is a double arm (75).

11. An automatic tool changer as defined in claim 10, wherein the arm (75) has a double arm construction having a pair of gripping means (82 to 85) and wherein one gripping means (82, 83) takes a new tool from the tool storage magazine (3, 103) and transfers it to the machine spindle (1b), and wherein the other gripping means (84, 85) grips an old tool and withdraws it from the machine spindle (1b), and wherein the positions of the new and old tools are exchanged by rotating the arm (75), and then the new tool is inserted into the machine spindle (1b), while the old tool is returned to a specific station in the tool storage magazine (3, 103).

12. An automatic tool changer as defined in claim 9, wherein the first direction (U) is perpendicular to the second direction (V).

13. The automatic tool changer of claim 9, wherein the positioning means (81) is a cam mechanism (81).

14. The automatic tool changer of claim 13, wherein the stop (89) is rotatable relative to the arm (75) around a pin (90).

15. The automatic tool changer of claim 14, wherein the cam mechanism (81) includes a circular cam plate (81) and wherein the stop (89) has a roller (93) which engages the cam plate (81).

* * * * *